United States Patent
Wang

(10) Patent No.: US 9,114,573 B2
(45) Date of Patent: Aug. 25, 2015

(54) ADAPTER FOR SWITCHING LIQUID PATCH DEVICE AND AIR PUMP

(71) Applicant: Min-Hsieng Wang, Tainan (TW)

(72) Inventor: Min-Hsieng Wang, Tainan (TW)

( * ) Notice: Subject to any disclaimer, the term of this patent is extended or adjusted under 35 U.S.C. 154(b) by 133 days.

(21) Appl. No.: 14/097,274

(22) Filed: Dec. 5, 2013

(65) Prior Publication Data
US 2015/0158257 A1    Jun. 11, 2015

(51) Int. Cl.
*B29C 73/16* (2006.01)
*B29C 73/02* (2006.01)
*B60S 5/04* (2006.01)

(52) U.S. Cl.
CPC ............. *B29C 73/166* (2013.01); *B29C 73/025* (2013.01); *B60S 5/04* (2013.01)

(58) Field of Classification Search
CPC .... B29C 73/166; B29C 73/02; B29C 73/025; B60C 28/062; B60S 5/04
USPC ............ 141/38, 104, 301–302; 137/223, 597, 137/625.46; 152/415
See application file for complete search history.

(56) References Cited

U.S. PATENT DOCUMENTS

| | | | | |
|---|---|---|---|---|
| 6,736,170 | B2 * | 5/2004 | Eriksen et al. | 141/38 |
| 8,505,591 | B2 * | 8/2013 | Eckhardt | 141/38 |
| 8,528,448 | B2 * | 9/2013 | Lolli | 81/15.6 |
| 8,863,779 | B2 * | 10/2014 | Hong | 137/625.46 |

* cited by examiner

*Primary Examiner* — Timothy L Maust
*Assistant Examiner* — Timothy P Kelly

(57) ABSTRACT

An adapter for switching liquid patch device and air pump includes a body which has an air intake path, an air outgoing path, a liquid outgoing path and a tire connection path. The air outgoing path and the liquid outgoing path are connected to the liquid bottle. The air intake path and the tire connection path are respectively connected with the pump connector and the tire connector. The body has an air inlet, an air outlet, a liquid outlet and a tire connection hole. The air inlet, the air outlet, the liquid outlet and the tire connection hole are respectively connected with the air intake path, the air outgoing path, the liquid outgoing path and the tire connection path. A stationary ceramic disk, a movable ceramic disk, and a knob are respectively installed to the installation face of the body. The knob is rotated to operate the air-pumping position and liquid-introducing position.

2 Claims, 7 Drawing Sheets

ADAPTER FOR SWITCHING LIQUID PATCH DEVICE AND AIR PUMP

BACKGROUND OF THE INVENTION

1. Fields of the Invention

The present invention relates to an adapter, and more particularly, to an adapter for switching the liquid patch device and the air pump.

2. Descriptions of Related Art

The conventional way to patch the tires of vehicles is to bring the tires or vehicles to the repair shops, however, if the tires flat on the high ways, the conventional way will not available. In order to quickly remove the problem of flat tires, the liquid patch device is developed and the liquid patch device includes a liquid patch bottle in which the liquid with special formula is received. The liquid is introduced into the tire to seal the apertures of the tire.

Nevertheless, the steps for operating the liquid patch device may not suitable for some of the users. As shown in FIG. 1 which discloses a conventional liquid patch device. The user has to connect the pump to the position A of the liquid patch device by one pipe, and then another hose is used to be connected between the position A of the liquid patch device and the tire. The liquid is then injected into the tire by operating the switch of the liquid patch device. The tire needs to be pumped after the liquid is injected into it and all of the hoses connected to the positions A and B of the liquid patch device. The steps are complicated and inconvenient for some users. Besides, after the liquid is injected into the tire, pressure has to be introduced into the tire via the liquid bottle, and the liquid bottle may be broken when the pressure is too high.

The present invention intends to provide an adapter for switching the liquid patch device and the air pump so as to improve the shortcomings mentioned above.

SUMMARY OF THE INVENTION

The present invention relates to an adapter for switching liquid patch device and air pump, and comprises a liquid bottle and a body which is connected to the liquid bottle. A pump connector and a tire connector are respectively connected to the body. The body has four independent paths which are an air intake path, an air outgoing path, a liquid outgoing path and a tire connection path. The air outgoing path and the liquid outgoing path are connected to the liquid bottle. The air intake path and the tire connection path are respectively connected with the pump connector and the tire connector. The body has an installation face in which four independent holes are defined, which are an air inlet, an air outlet, a liquid outlet and a tire connection hole. The air inlet, the air outlet, the liquid outlet and the tire connection hole are respectively connected with the air intake path, the air outgoing path, the liquid outgoing path and the tire connection path. A stationary ceramic disk is located on the installation face of the body. A movable ceramic disk is located on the stationary ceramic disk. A knob is connected on the movable ceramic disk so as to rotate the movable ceramic disk relative to the stationary ceramic disk. The stationary ceramic disk is sealed with the body and the movable ceramic disk.

The stationary ceramic disk has four independent units which are an air intake unit, an air outgoing unit, a liquid outgoing unit and a tire connection hole unit. The air intake unit, the air outgoing unit, the liquid outgoing unit and the tire connection hole unit are respectively connected with the air inlet, the air outlet, the liquid outlet and the tire connection hole. The movable ceramic disk has a first slot and a second slot.

When the movable ceramic disk is rotated to an air-pumping position by operating the knob, the air intake unit communicates with the tire connection hole unit via the first slot. When the movable ceramic disk is rotated to a liquid-introducing position by operating the knob, the air intake unit communicates with the air outgoing unit via the first slot. In the meanwhile, the liquid outgoing unit communicates with the tire connection hole unit via the second slot.

Preferably, the stationary ceramic disk is sealed to the body by seal rings.

Preferably, a plate is located between the knob and the movable ceramic disk. A first restriction portion and a second restriction portion extend from the periphery of the plate. A sliding portion extends from the periphery of the movable ceramic disk. The sliding portion slides between the first and second restriction portions.

Preferably, the movable ceramic disk has a first smooth face and the stationary ceramic disk has a second smooth face, the first and second faces are snugly matched to each other.

The present invention can easily switch the air-pumping position and liquid-introducing position without complicated connections. When the liquid is introduced into the tire, the switch does not need to be closed and the air-pumping position can be safely switched to.

The present invention uses the two respective smooth faces to achieve the seal feature between the movable and stationary ceramic disks.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
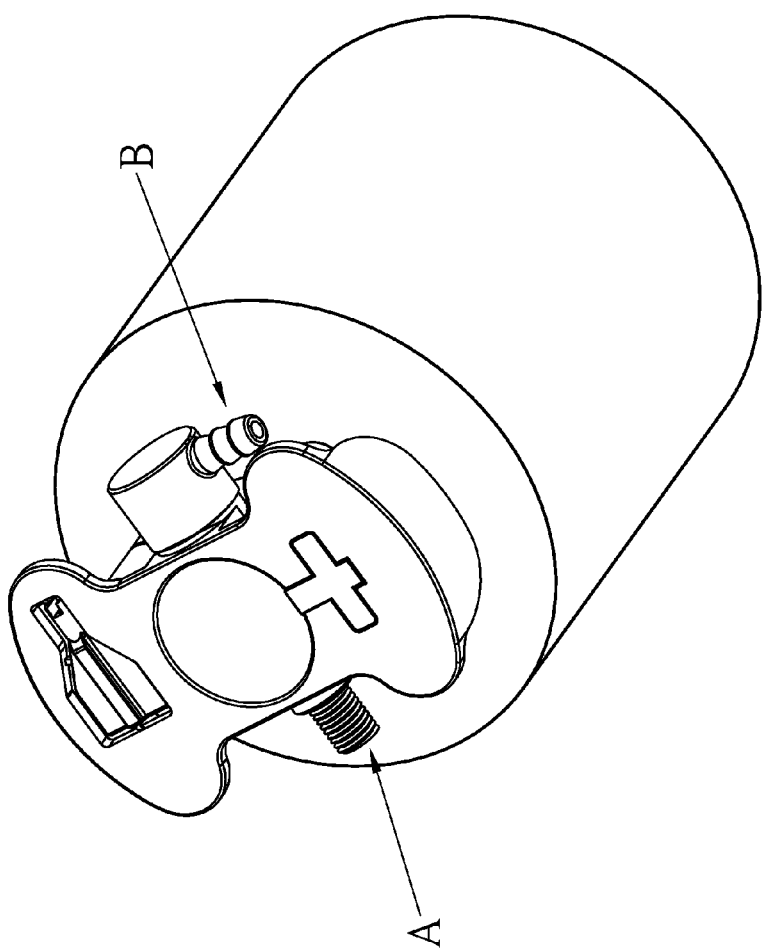
FIG. 1 shows the conventional liquid patch device.
Figure 2:
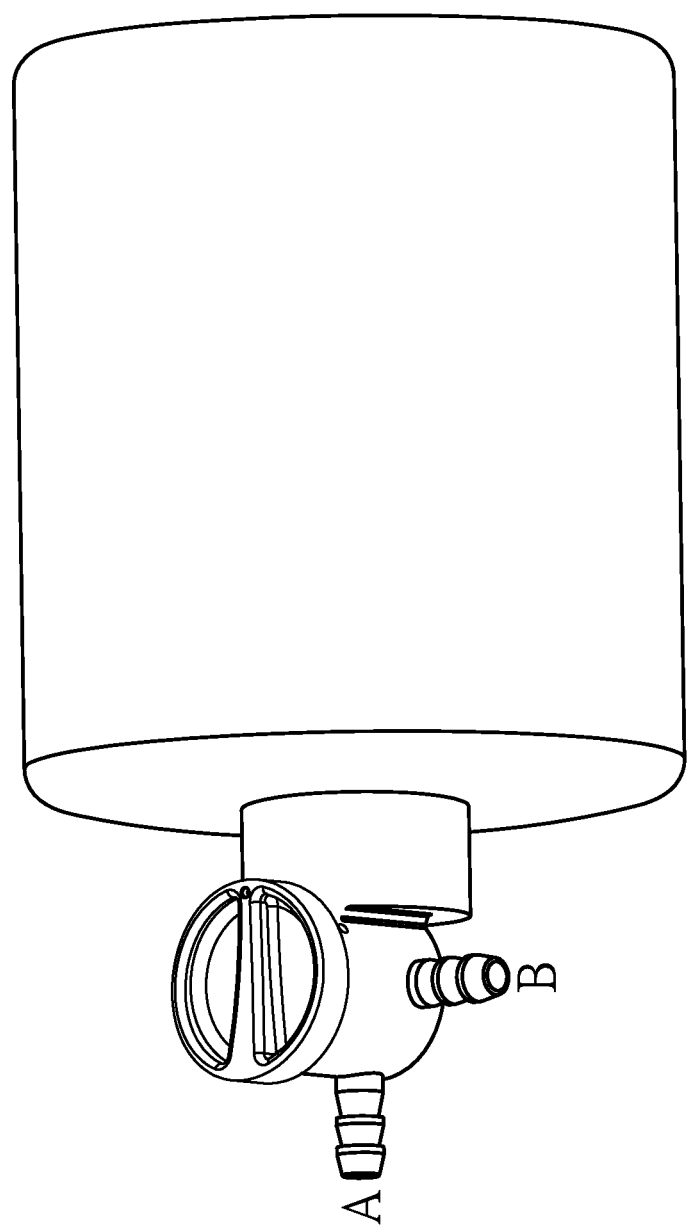
FIG. 2 shows that the adapter of the present invention is connected with a liquid bottle.
Figure 3:
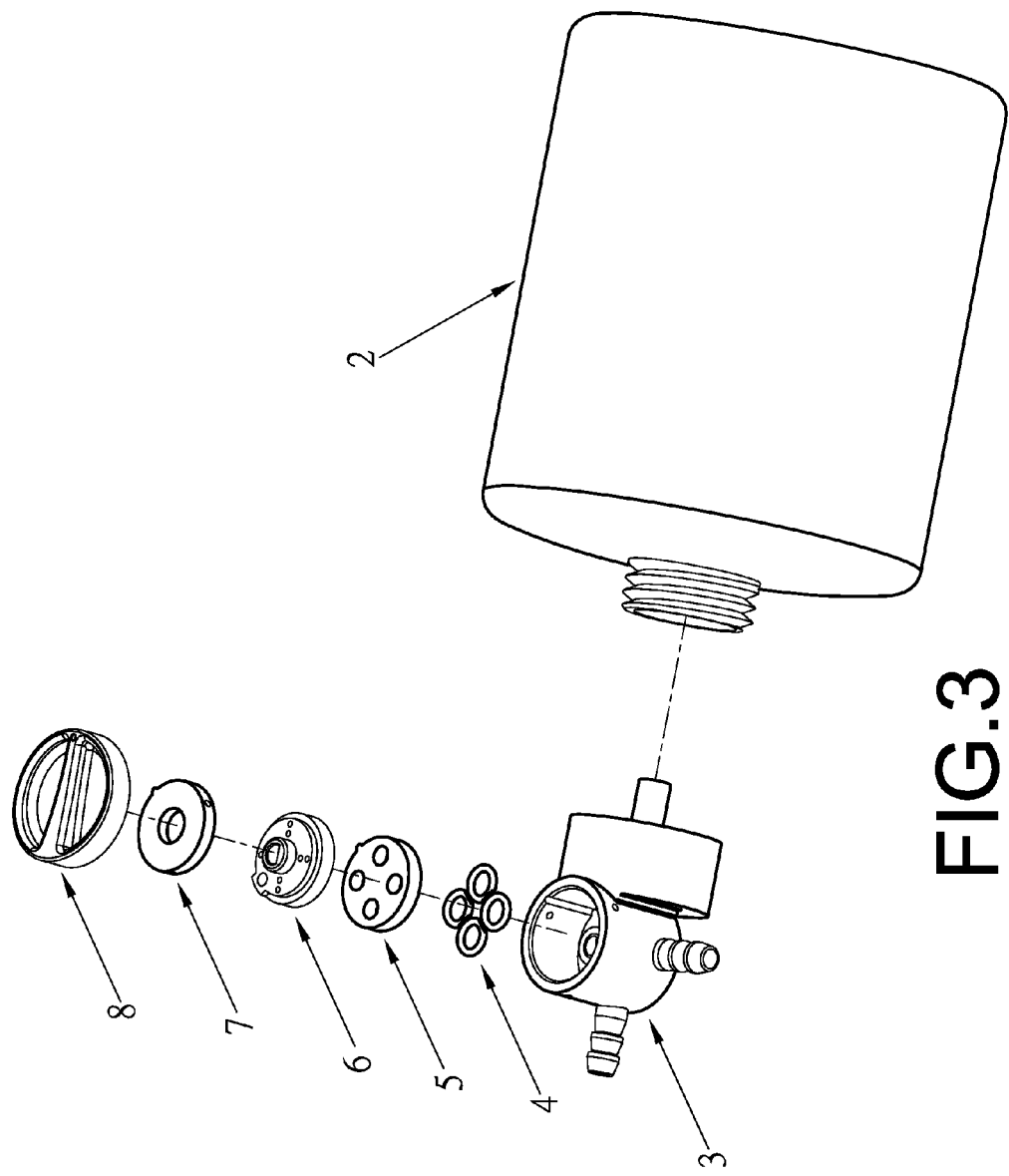
FIG. 3 is an exploded view of the adapter of the present invention.
Figure 4:
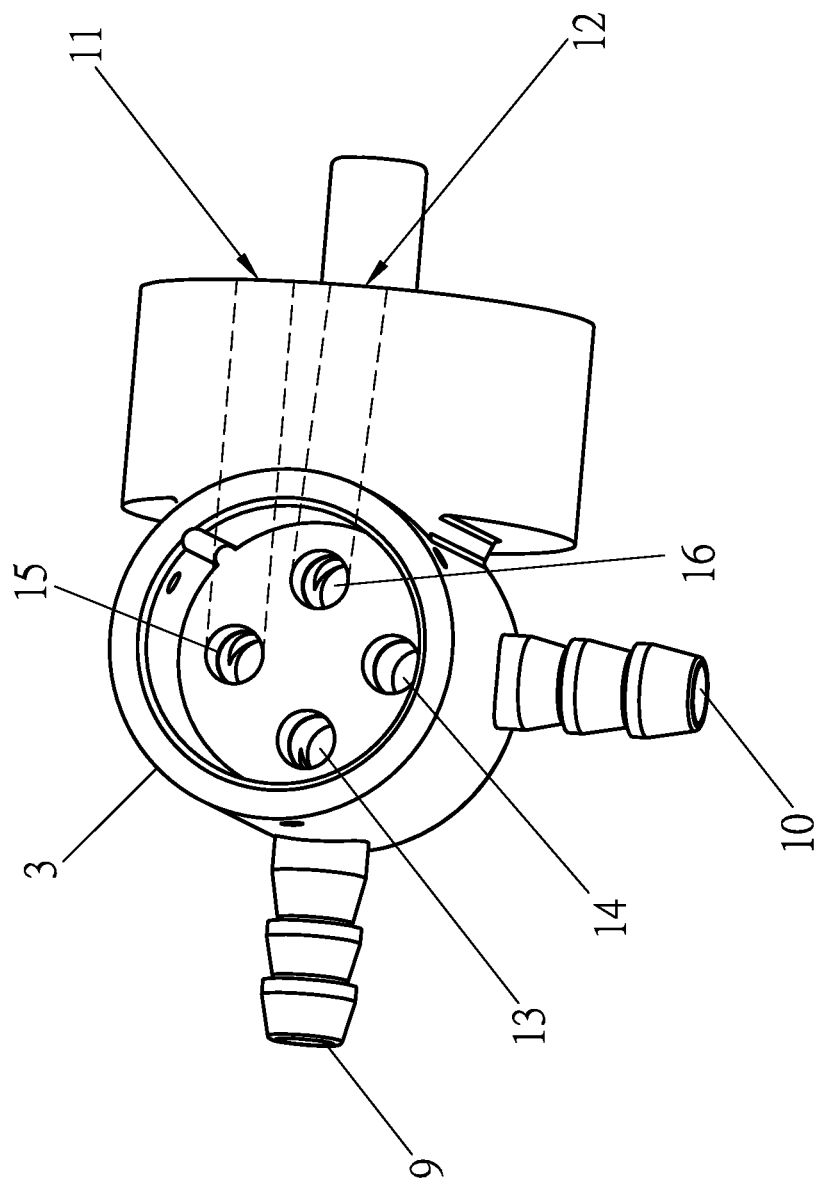
FIG. 4 is a perspective view to show the adapter of the present invention.

Referring to FIGS. 2 to 4, the adapter of the present invention comprises a body 3, seal rings 4, a stationary ceramic disk 5, a movable ceramic disk 5, a plate 7 and a knob 8.

The body 3 is connected to a liquid bottle 2 in any known way. A pump connector 9 and a tire connector 10 are respectively connected to the body 3. The pump connector 9 is connected to a pump by a hose or by directly connected with the pump. The tire connector 10 is connected to the valve of the tire. As shown in FIG. 4, the body 3 has four independent paths which are an air intake path, an air outgoing path 11, a liquid outgoing path 12 and a tire connection path. The air outgoing path 11 and the liquid outgoing path 12 are connected to the liquid bottle 2. The air intake path and the tire connection path are respectively connected with the pump connector 9 and the tire connector 10. The body 3 has an installation face in which four independent holes are defined, the four holes are an air inlet 13, an air outlet 15, a liquid outlet 16 and a tire connection hole 14. The air inlet 13, the air outlet 15, the liquid outlet 16 and the tire connection hole 14 are respectively connected with the air intake path, the air outgoing path 11, the liquid outgoing path 12 and the tire connection path. The stationary ceramic disk 5 is located on the installation face of the body 3 and the stationary ceramic disk 5 is sealed to the body 3 by the seal rings 4. The movable ceramic disk 6 is located on the stationary ceramic disk 5. The knob 8 is connected on the movable ceramic disk 6 so as to rotate the movable ceramic disk 6 relative to the stationary ceramic disk 5. The plate 7 is located between the knob 8 and the movable ceramic disk 6. The stationary ceramic disk 5 is sealed with the body 3 and the movable ceramic disk 6. The movable ceramic disk 6 has a first smooth face and the stationary ceramic disk 5 has a second smooth face, the first and second faces are ground to be fine and smooth, so as to be snugly matched to each other.

Figure 5:
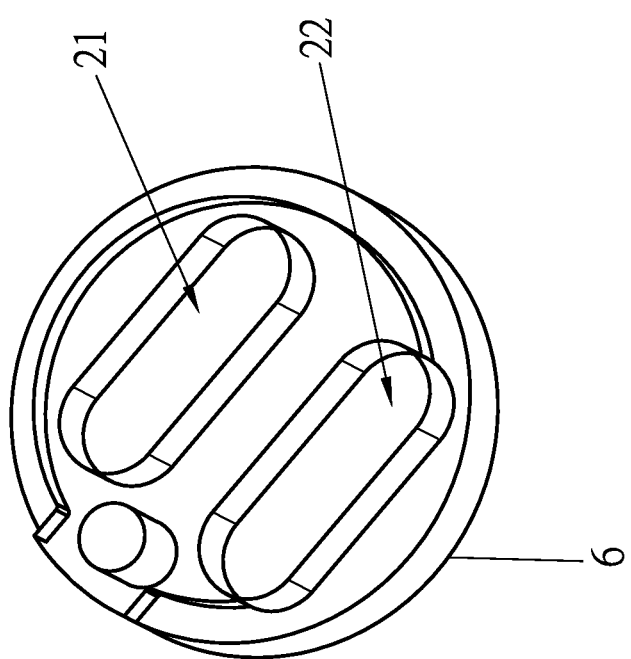
FIG. 5 shows the movable ceramic disk of the adapter of the present invention.
Figure 6:
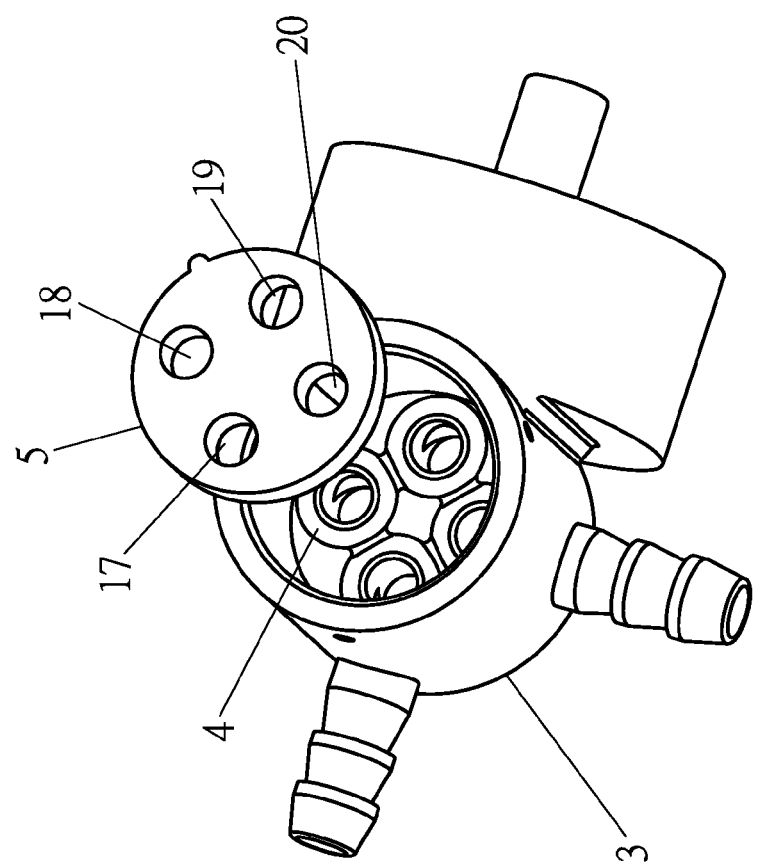
FIG. 6 shows the stationary ceramic disk of the adapter of the present invention.

As shown in FIGS. 5 and 6, the stationary ceramic disk 5 has four independent units which are an air intake unit 17, an air outgoing unit 18, a liquid outgoing unit 19 and a tire connection hole unit 20. The air intake unit 17, the air outgoing unit 18, the liquid outgoing unit 19 and the tire connection hole unit 20 are respectively connected with the air inlet 13, the air outlet 15, the liquid outlet 16 and the tire connection hole 14. The movable ceramic disk 6 has a first slot 21 and a second slot 22.

When the movable ceramic disk 6 is rotated to the air-pumping position by operating the knob 8, the air intake unit 17 communicates with the tire connection hole unit 20 via the first slot 21. The pressurized air enters into the air inlet path via the pump connector 9, the pressurized air then is introduced into the tire via the air inlet 13, the air intake unit 17, the first slot 21, the tire connection hole unit 20, the tire connection hole 14, the tire connection path, and the tire connector 10 so as to pump the tire.

When the movable ceramic disk 6 is rotated to the liquid-introducing position by operating the knob 8, the air intake unit 17 communicates with the air outgoing unit 18 via the first slot 21. The liquid outgoing unit 19 communicates with the tire connection hole unit 20 via the second slot 22. The pressurized air from the pump enters into the air inlet path via the pump connector 9. The pressurized air enters into air intake path, the air inlet 13, the air intake unit 17, the first slot 21, the air outgoing unit 18, the air outlet 15, the air outgoing path 11 and finally enters into the liquid bottle 2. The pressure in the liquid bottle 2 pushes the liquid in the liquid bottle 2 to flow through the liquid outgoing path 12, the liquid outlet 16, the liquid outgoing unit 19 and enters into the second slot 22. When the liquid passes through the second slot 22, the liquid enters into the tire via the tire connection hole unit 20, the tire connection hole 14, the tire connection path and the tire connector 10. When the liquid in the liquid bottle 2 completely flows into the tire, the user then switches the knob 8 to the air-pumping position to inflate the tire without detaching any hose.

Figure 7:
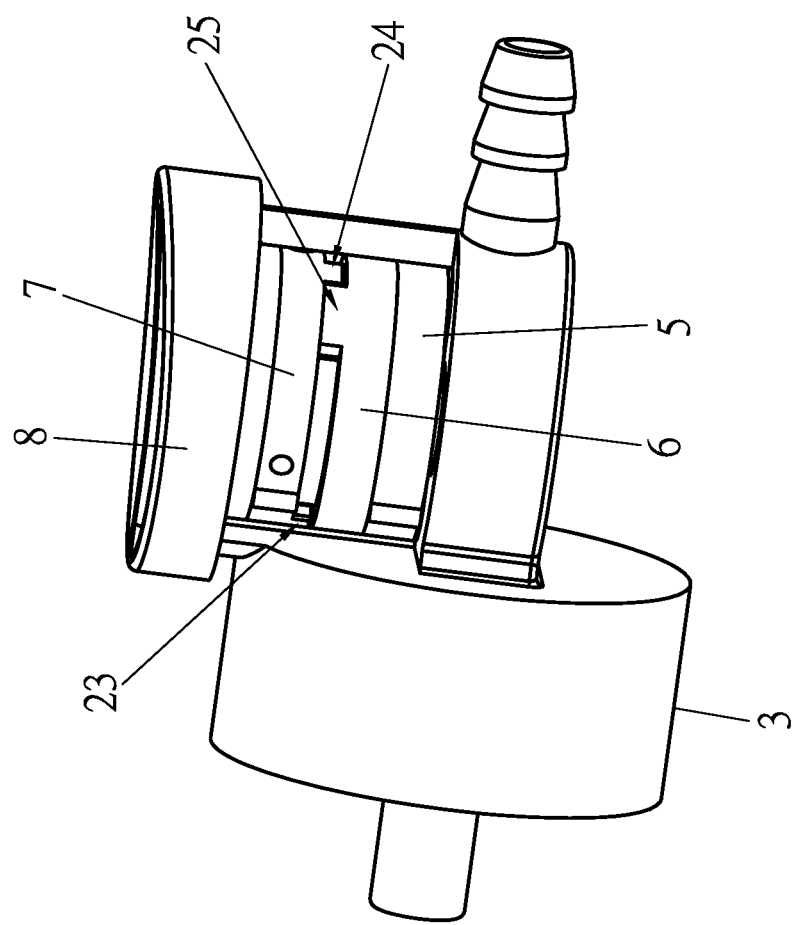
FIG. 7 shows the position relationship between the restriction portions and the sliding portion of the adapter of the present invention.

As shown in FIG. 7, in order to prevent the movable ceramic disk 6 from overly rotated to cause the effective air-pumping position and the liquid-introducing position not work properly, the plate 7 is used. A first restriction portion 24 and a second restriction portion 23 extend from the periphery of the plate 7. A sliding portion 25 extends from the periphery of the movable ceramic disk 6. The sliding portion 25 slides between the first and second restriction portions 24, 25, so that when the movable ceramic disk 6 is rotated to make the sliding portion 25 contact the first restriction portion 24, the position is the effective air-pumping position. Similarly, when the movable ceramic disk 6 is rotated to make the sliding portion 25 contact the second restriction portion 23, the position is the effective liquid-introducing position.

While we have shown and described the embodiment in accordance with the present invention, it should be clear to those skilled in the art that further embodiments may be made without departing from the scope of the present invention.

What is claimed is:

1. An adapter for switching liquid patch device and air pump, comprising:
   a liquid bottle;
   a body connected to the liquid bottle, a pump connector and a tire connector respectively connected to the body, the body having four independent paths which are an air intake path, an air outgoing path, a liquid outgoing path and a tire connection path, the air outgoing path and the liquid outgoing path connected to the liquid bottle, the air intake path and the tire connection path respectively connected with the pump connector and the tire connector, the body having an installation face in which four independent holes are defined which are an air inlet, an air outlet, a liquid outlet and a tire connection hole, the air inlet, the air outlet, the liquid outlet and the tire connection hole respectively connected with the air intake path, the air outgoing path, the liquid outgoing path and the tire connection path, a stationary ceramic disk located on the installation face of the body, a movable ceramic disk located on the stationary ceramic disk, a knob connected on the movable ceramic disk so as to rotate the movable ceramic disk relative to the stationary ceramic disk, the stationary ceramic disk being sealed with the body and the movable ceramic disk;
   the stationary ceramic disk having four independent units which are an air intake unit, an air outgoing unit, a liquid outgoing unit and a tire connection hole unit, the air intake unit, the air outgoing unit, the liquid outgoing unit and the tire connection hole unit respectively connected with the air inlet, the air outlet, the liquid outlet and the tire connection hole, the movable ceramic disk having a first slot and a second slot, and
   when the movable ceramic disk is rotated to an air-pumping position by operating the knob, the air intake unit communicates with the tire connection hole unit via the first slot, when the movable ceramic disk is rotated to a liquid-introducing position by operating the knob, the air intake unit communicates with the air outgoing unit via the first slot, the liquid outgoing unit communicates with the tire connection hole unit via the second slot.

2. The adapter as claimed in claim 1, wherein the stationary ceramic disk is sealed to the body by seal rings, a plate is located between the knob and the movable ceramic disk, a first restriction portion and a second restriction portion extend from a periphery of the plate, a sliding portion extends from a periphery of the movable ceramic disk, the sliding portion slides between the first and second restriction portions, the movable ceramic disk has a first smooth face and the stationary ceramic disk has a second smooth face, the first and second faces are snugly matched to each other.

* * * * *